July 30, 1963  H. HABEREDER  3,099,810
MINIATURE POTENTIOMETER
Filed March 18, 1960  5 Sheets-Sheet 1

INVENTOR.
HANS HABEREDER
BY Louis J. Knobbe
ATTORNEY

July 30, 1963 H. HABEREDER 3,099,810
MINIATURE POTENTIOMETER
Filed March 18, 1960 5 Sheets-Sheet 2
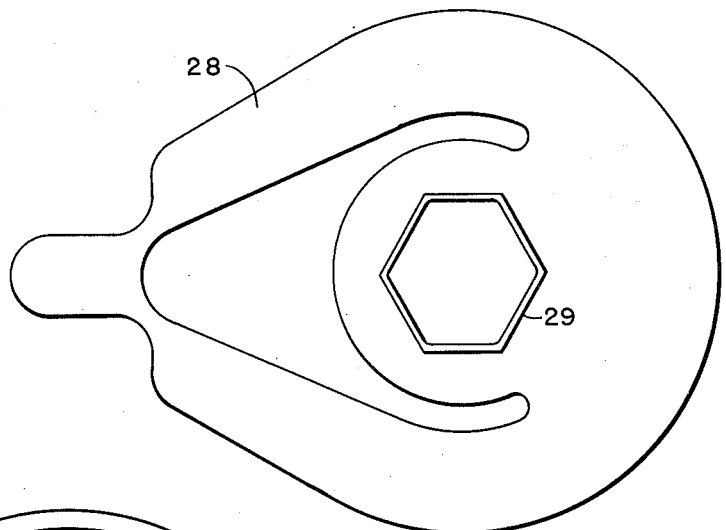
FIG. 5
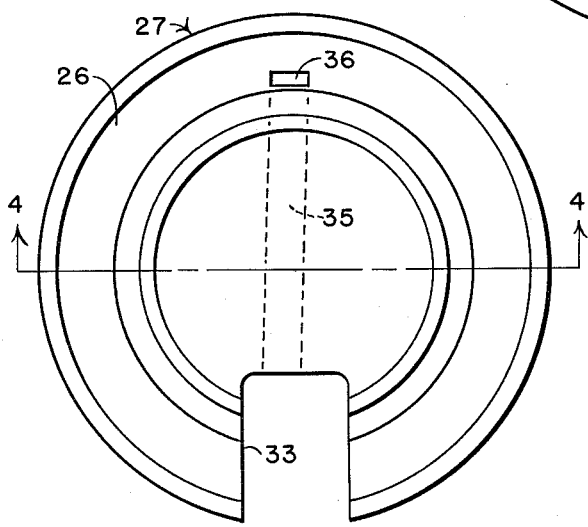
FIG. 3
FIG. 4
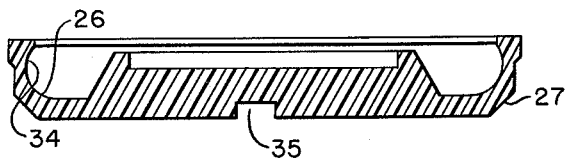
INVENTOR.
HANS HABEREDER
BY Louis J. Kobbe
ATTORNEY July 30, 1963   H. HABEREDER   3,099,810
MINIATURE POTENTIOMETER
Filed March 18, 1960   5 Sheets-Sheet 3

INVENTOR.
HANS HABEREDER
BY Louis J. Knobbe
ATTORNEY

July 30, 1963    H. HABEREDER    3,099,810
MINIATURE POTENTIOMETER
Filed March 18, 1960    5 Sheets-Sheet 4

INVENTOR.
HANS HABEREDER
BY Louis J. Knobbe
ATTORNEY

July 30, 1963     H. HABEREDER     3,099,810
MINIATURE POTENTIOMETER
Filed March 18, 1960                           5 Sheets-Sheet 5
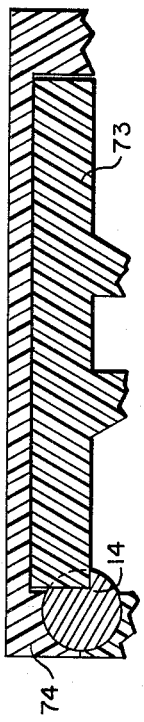
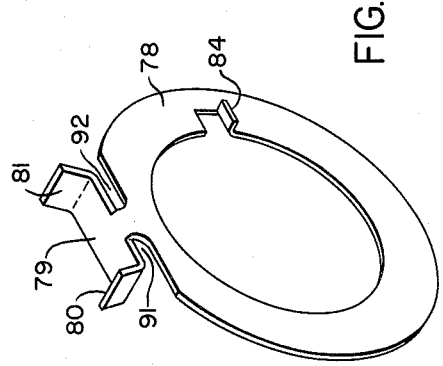
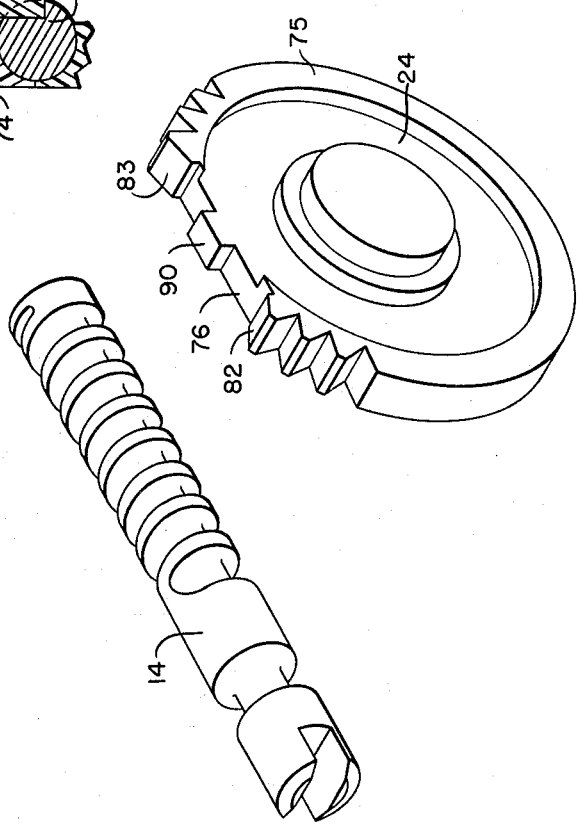
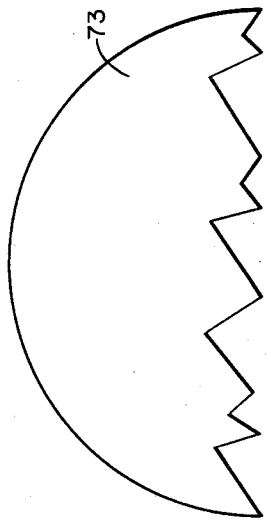
INVENTOR.
HANS HABEREDER
BY Louis J. Kobbe
ATTORNEY United States Patent Office 3,099,810
Patented July 30, 1963

3,099,810
MINIATURE POTENTIOMETER
Hans Habereder, Costa Mesa, Calif., assignor to Beckman Instruments, Inc., a corporation of California
Filed Mar. 18, 1960, Ser. No. 15,996
12 Claims. (Cl. 338—162)

This invention relates to potentiometers and more particularly to potentiometers adapted for miniaturization.

Miniaturized potentiometers presently known in the art are not adapted for low cost of manufacture. They utilize a large number of elements and require a plurality of manufacturing operations. One reason that a considerable number of elements are required is that few if any of the prior art potentiometers employ elements having dual functions. The elements used in these potentiometers usually provide only a single function; therefore, the number of elements employed is substantially equal to the number of required functions. Prior art potentiometers also require a large amount of labor for their assembly because of such manufacturing operations as cementing the resistance element to a retaining member and carefully measuring on the resistance element to properly locate taps thereon, after which the taps are applied using special tapping equipment.

Another disadvantage of the prior art potentiometers is that they oftentimes exhibit undesirable electrical characteristics. Some potentiometers have two or more friction electrical connections of poor design connecting the potentiometer movable contact to an electrical connection outside the potentiometer case. These multiple friction contacts result in a relatively high and variable resistance connection to the movable contact, particularly under conditions of vibration and shock. Another electrical problem associated with the prior art devices is that they have a low leakage resistance between the potentiometer circuitry and the potentiometer housing. Because of the problems associated with mounting elements which are movable with respect to the housing, many prior art potentiometers fail to provide continuous dielectric material between the potentiometer circuitry and housing.

Contemporary miniaturized potentiometers also lack a suitable means for preventing movement of the potentiometer movable contact beyond a predetermined point. A stop mechanism is particularly desirable when the resistance element is retained in a circular path. Unless a stop is provided, the potentiometer contact is permitted to pass over the ends of the resistance resulting in an abrupt change in resistance at the potentiometer output terminals. Such a sudden change in resistance cannot be tolerated in some applications.

Accordingly, it is an object of this invention to provide a potentiometer of very small size which is inexpensive to manufacture.

It is another object of this invention to provide potentiometer elements which serve dual functions, thereby minimizing the total number of elements required for constructing miniature potentiometers.

It is still another object of this invention to reduce the number of manufacturing operations required to construct miniature potentiometers by obviating the necessity for cementing the resistance element to a retaining member and by providing a potentiometer in which the accurate tapping of the resistance element is inherently afforded by the potentiometer structure.

Another object of this invention is to provide a miniaturized potentiometer having improved electrical characteristics including a minimum and constant resistance path between an electrical connection outside the potentiometer housing and the potentiometer movable contact under conditions of vibration and shock, and very high leakage resistance between the potentiometer circuitry and the potentiometer housing.

A further object of this invention is to provide an improved stop for the contact arm of a potentiometer.

Other and further objects, features and advantages of the invention will become apparent as the description proceeds.

Briefly, in accordance with a preferred form of the present invention, there is provided a potentiometer which comprises a base member having mutually orthogonal cylindrical cavities therein. One of these cavities is larger than the other and has integral therewith a means for mounting a resistance element such that electrical contact therewith is facilitated. A contact mounting gear is also mounted within the larger cavity and has affixed to it an electrical contact which is adapted to serve as the potentiometric movable contact. A spring of simple design is mounted between the resistance element support and the movable contact and serves the dual functions of providing an electrical slip ring connection to the movable contact and preventing the movable contact from vibrating when the potentiometer is subject to great vibration or shock. A cover is mounted on the base member over the larger cavity and provides a rotatable support for the contact mounting gear. A worm gear is mounted in the smaller of the aforementioned cavities and engages the contact mounting gear so that a rotation of said worm gear will cause a rotation of the movable contact.

This structure permits construction of a potentiometer having improved electrical characteristics. The spring member may be directly and rigidly connected to an electrical contact outside the potentiometer housing. Thus, the slip ring connection between the movable contact and spring member is the only friction contact in the series path between the external contact and the movable contact. High resistance leakage paths between the electrical circuitry and the potentiometer housing are provided by widely separating conductive elements of the housing from the electrical circuitry. As one example, of which others are described hereinafter, the contact mounting gear is preferably constructed from a continuous piece of nonconductive material. A boss may be formed on this gear for mating with an opening in the housing cover. The housing cover, which may be an electrically conductive member, is therefore widely separated from the electrical circuit elements mounted below the spur gear. A significant corollary of this type of construction is that the housing cover may be constructed by an inexpensive stamping operation instead of a more expensive machining operation.

Since the present invention ordinarily employs a resistance element mounted in a circular path, a continuous rotation of the movable contact will result in an abrupt change from minimum to maximum resistance. This type of operation may be undesirable and therefore this invention provides a unique stop for preventing rotation of the movable contact beyond a predetermined point, without any undesirable damage or stripping of the gear teeth.

A more thorough understanding of the invention may be obtained by study of the following detailed description taken in connection with the accompanying drawings in which:

FIG. 3 is a plan view of the resistance coil retainer;

FIG. 4 is a cross-sectional view of the resistance coil retainer taken along the line 4—4 of FIG. 3;

FIG. 5 is a view in elevation of the contact member;

FIG. 9 is a partial cross-sectional view of another embodiment of this invention;

FIG. 10 is a view of a toothless gear adapted for use with the potentiometer shown in FIG. 9;

FIG. 11 is an exploded view of a stop mechanism constructed in accordance with this invention.

Figure 1:
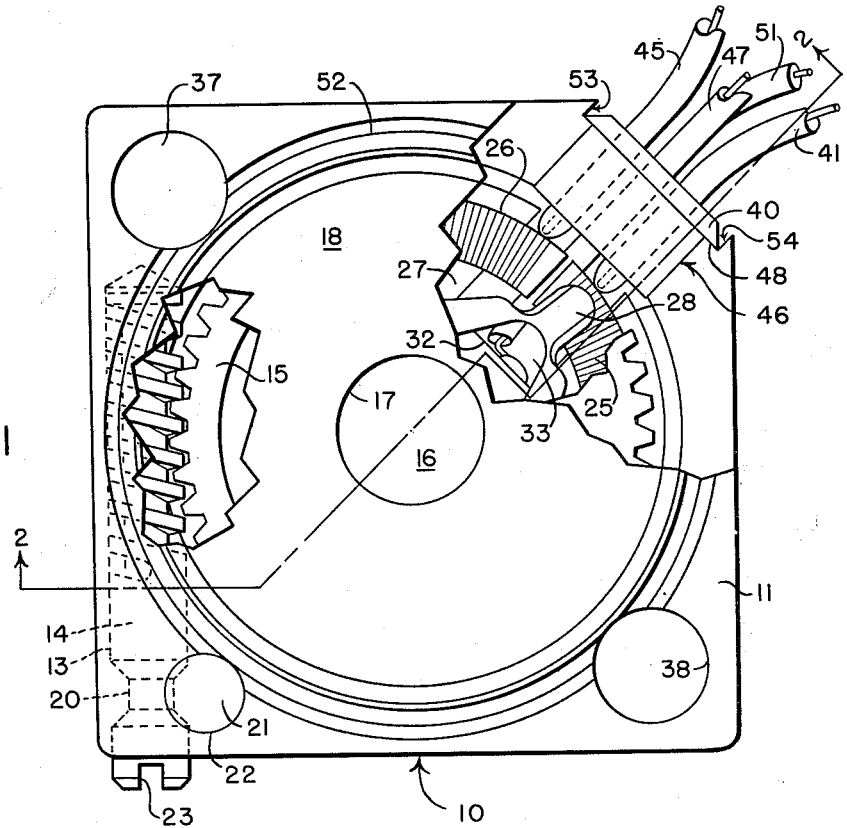
FIG. 1 is a plan view of a potentiometer embodying the invention in which two cutaway portions disclose parts within the potentiometer housing.
Figure 2:
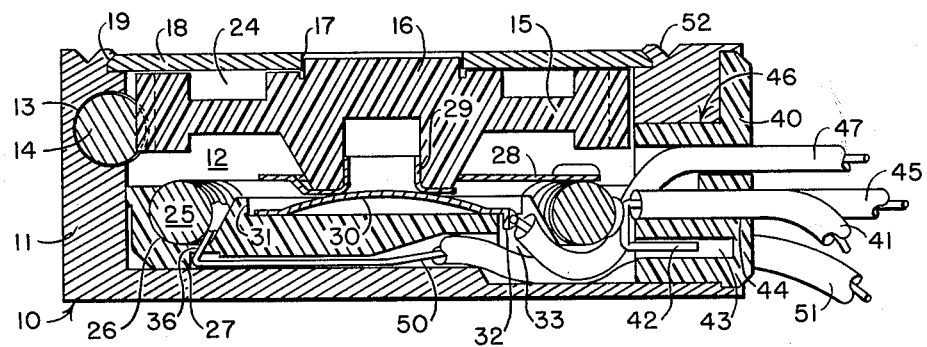
FIG. 2 is a cross-sectional view taken along the line 2—2 of FIG. 1.

Referring now to FIGS. 1 and 2, there is shown a preferred embodiment of this invention which comprises a potentiometer 10 having a substantially rectangular housing 11. The housing may comprise a single rectangular block of material having a centrally located circular bore formed therein leaving an internal, cylindrically-shaped cavity 12. Different materials may be used to form housing 11; both die cast aluminum and molded glass filled diallyl phthalate resin have been found to be particularly adapted for this purpose. Housing 11 is provided in diagonally opposite corners with holes 37 and 38 having axes extending parallel with the axis of the cavity 12 for mounting the potentiometer singly or in a stack with others.

It will be understood that the potentiometer shown in the figures is considerably enlarged for illustrative purposes. Representative outside dimensions of potentiometers constructed in accordance with this invention are ½" x ½" x ⁹⁄₁₆".

An additional cylindrical cavity 13 is located in housing 11 so that the axes of the cavities 12 and 13 are mutually orthogonal. In order to illustrate this structure more clearly, the internally located cavity 13 is shown by dotted lines in FIG. 1. A worm gear or lead screw 14 is retained in the cavity to allow teeth of the gear 14 to extend within cavity 12 for engaging the teeth of a contact mounting gear 15. Gear 15 preferably comprises a spur gear as shown, although other types of gears known in the art may be utilized. Rotation of worm gear 14 causes spur gear 15 to rotate an amount determined by the gear ratio. As shown by dotted lines in FIG. 1, worm gear 14 may be conveniently retained in housing 11 by a pin 21 engaging an annular groove 20 formed near one end of the worm gear. Pin 21 is retained in a cavity 22 which is formed in the housing 11 perpendicular to the cavity 13 and located so that the edges of the annular groove 20 lie within it. Pin 21 is preferably formed of a resilient material such as polychlorotrifluoroethylene resin and is force fit into the cavity 22 to friction load worm gear 14 and prevent rotation of the worm gear when the potentiometer is subjected to great vibration or shock. A screw driver slot 23 may be formed at one end of worm gear 14 for rotating it from outside the potentiometer.

Spur gear 15 is preferably formed of a resilient material such as polychlorotrifluoroethylene. This material may be readily molded, is electrically nonconductive and is easily temporarily deformed. A fairly deep annular groove 24 is provided for containing a stop mechanism if needed. This mechanism will be described in detail hereinafter. Gear 15 also has a coaxial circular boss 16 formed on the same surface as groove 24. This boss permits gear 15 to be conveniently and inexpensively mounted by simply drilling a mating orifice 17 in a disc-shaped member 18. Member 18 also serves as a cover for the potentiometer housing; this member may conveniently take the form of a thin disc having a periphery adapted to mate with a groove 19 formed in the sidewalls of the cavity 12. Cover 18 may be inexpensively produced by a stamping operation while spur gear 15 may be completely molded, thus obviating the necessity of machining either member. This construction in addition provides a very high resistance leakage path from the cover to the electrical circuitry within the potentiometer housing; this is facilitated by constructing spur gear 15 of a continuous piece of nonconductive material and directly inserting it between the cover 18 and the circuit elements mounted beneath the spur gear.

The potentiometer resistance coil 25 shown in FIG. 1 is constructed of resistance wire wound on a core of circular cross section and mounted so as to follow a circular path. An alternative resistance element may be constructed in accordance with the teachings of an application Serial No. 700,746, now Patent No. 2,950,996, of Thomas M. Place, Sr., et al., entitled "Electrical Resistance Material and Method of Making Same," filed December 5, 1957, and assigned to Beckman Instruments, Inc., assignee of the present invention. This application discloses a ceramic type of resistance material which may be applied to a nonconductive refractory base. This type of resistance element is particularly adapted for use in high temperatures. A resistance coil retainer 27 is mounted in the bottom of cylindrical cavity 12 and may be affixed therein by a close fit. This type of construction will be required whenever the housing 11 is constructed of an electrically conductive material. When the housing 11 is itself electrically insulative, the coil retainer 27 may be formed within the casing itself. A modified potentiometer so constructed is described hereinafter.

The coil retainer 27 is shown in detail in FIGS. 3 and 4. This element is also preferably molded from a resilient material such as polychlorotrifluoroethylene, and comprises essentially, a disc-shaped member with the annular groove 26 and a slot 33. The groove 26 is preferably molded with an undercut portion 34 so that the resistance coil may be merely snapped into place and retained securely without the use of cement. This type of construction avoids the necessity of any drying or curing of the cement. As described more fully hereinafter, the slot 33 permits access to the ends of the resistance element from the side of the coil retainer, and thus facilitates the connection of external leads to the resistance element. A groove 35 is provided in the side of the coil retainer opposite the side in which annular groove 26 is located. As noted below, an electrical connection to another portion of the resistance coil may be provided by placing an electrical conductor in this groove and contacting the resistance coil through an opening 36.

The movable electrical connection to the resistance coil 25 is provided by a contact arm 28. As shown in FIG. 5, this arm is preferably constructed from a single metal spring strip. Referring again to FIG. 2, this arm has a central portion affixed to the spur gear 15 so as to be rotatable therewith, and an elongated portion which makes electrical contact with the resistance coil 25. A convenient means of mounting this contact arm to the spur gear is to form a hexagonally shaped protrusion 29 (shown in FIG. 5) in the contact arm which is force fit into a circular opening in the spur gear 15. Because of the resiliency of the spur gear, the opening therein conforms to the noncircular protrusion thus providing a rigid, yet inexpensive connection. For additional securing of the contact arm to the gear, spring 30 produces an upward force to hold the arm into the gear.

Spring 30 is a curved disc of conductive spring-like material. The spring with its concave side downward lies in a suitable circular depression 31 formed in the coil retainer 27. The spring is prevented from rotating by a tap 32 which fits into the slot 33 in the coil retainer.

The convex side of the spring 30 abuts the contact arm 28 and provides an electrical slip ring connection to the contact arm 28, as well as holding the arm into the spur gear. Because of the large area of contact between the spring 30 and the contact arm 28 a very low resistance connection is possible. Also of importance is that this connection maintains a constant low impedance as the contact arm is rotated relative to the spring. Moreover, the connection between the contact arm and the spring prevents the contact arm and gear from vibrating when the potentiometer is subject to great vibration or shock. Thus, although spring 30 is an inexpensive and easily manufactured item, it nonetheless provides the dual functions of forming an electrical slip ring connection and preventing vibration in a very satisfactory manner.

Electrical connections from the outside of the potentiometer are made via a cylindrical plug 40 molded from insulative material. Lead wire 41 has a bared end 42 inserted in a cylindrical pocket 43. A U-shaped bend in the wire permits it to be passed through a circular orifice 44 in the plug 40. Lead wire 45 is similarly affixed in plug 40. The U-shape formed in this lead wire in combination with the orifices of the plug 40 provides the important functions of retaining the lead wires in the plug very securely without further mechanical fastening and positioning the resistance coil taps very accurately. As shown in FIG. 1, the plug 40 is inserted in a mating cylindrical opening 46 in the housing 11. Shoulders 48 formed on the plug determine the depth to which the plug extends into the housing. As shown in a cutaway portion of FIG. 1, the slot 33 in the coil retainer exposes the ends of the resistance element 25 so as to permit access thereto from the side of the retaining element. With the plug 40 inserted into the side opening 46, the ends of the electrical leads 41 and 45 will either touch or be in close relationship to a respective end of the resistance coil 25. A drop of conductive cement may be applied to each junction to assure good electrical contact between the leads and the resistance element. The tap positions on the resistance element are controlled very accurately by the distance between the molded pocket 43 and the other molded pocket for lead 45 (not shown). The means afforded by the plug 40 for tapping the resistance element is a significant advance in the art. Previously, accurately positioning the tap positions required the use of careful angular measurements and special tapping equipment.

The electrical connection to the spring disc 30 comprises lead wire 47 welded to the spring tap 32 prior to assembly of the spring in the potentiometer. An additional hole in the plug 40 allows lead 47 to extend to the outside of the potentiometer. This positive connection between the contact outside of the potentiometer housing and the spring insures a minimum and constant series resistance path from the outside contact to the potentiometer movable contact. In this series path there is only a single friction contact, i.e., between the spring and the movable contact. And as noted above, this connection has been designed to give a minimum and constant resistance.

A tap to the center or any other preferred position of the resistance coil 25 may be provided by placing a conducting wire or a flat metal strip 50 in the groove 35 in the bottom of coil retainer 27. When the housing 11 is constructed of a conductive material, the conductor 50 will, of course, be insulated therefrom by appropriate insulation placed between the conductor and the housing. As shown in FIG. 2, one end of this strip passes through the opening 36 in the coil retainer to make electrical contact with the resistance coil 25 at the appropriate position, and the other end of the strip is welded to one end of lead wire 51. When the center tap is desired, plug 40 will include an additional hole through which the center tap lead 51 may be passed to the outside of the potentiometer.

The potentiometer construction is completed by fastening the cover and plug to the rectangular portion of the potentiometer housing. As shown in FIG. 1, V-shaped groove 52 cut in a circular path in the top of the housing 11 permits the cover to be fastened by staking or folding a peripheral edge of the groove 19 over the cover 18. In similar manner, edges 53 and 54 of a rectangular slot in the corner of housing 11 are folded over the rectangular edges of the plug shoulders 48 to fasten plug 40 to the housing 11.

An examination of the potentiometer of the invention will reveal several reasons for its improved electrical characteristics. As described above, the novel construction affords a minimum and constant resistance between the contact outside of the potentiometer housing and the potentiometer movable contact. Also described above is the spur gear and associated mounting cover for materially increasing the leakage resistance between the electrical circuit elements within the potentiometer and the potentiometer housing. Referring particularly now to FIG. 2, it may be observed that coil retainer 27 provides a wide separation between the resistance element 25 and housing 11. Also, the metal worm gear 14 is situated so as to be widely separated from the resistance coil 25 and movable contact 28, and likewise a wide separation is maintained between the movable contact and the potentiometer housing. These wide separations materially increase the resistance of the leakage paths to the potentiometer housing and substantially improve the electrical characteristics thereof.

Figure 7:
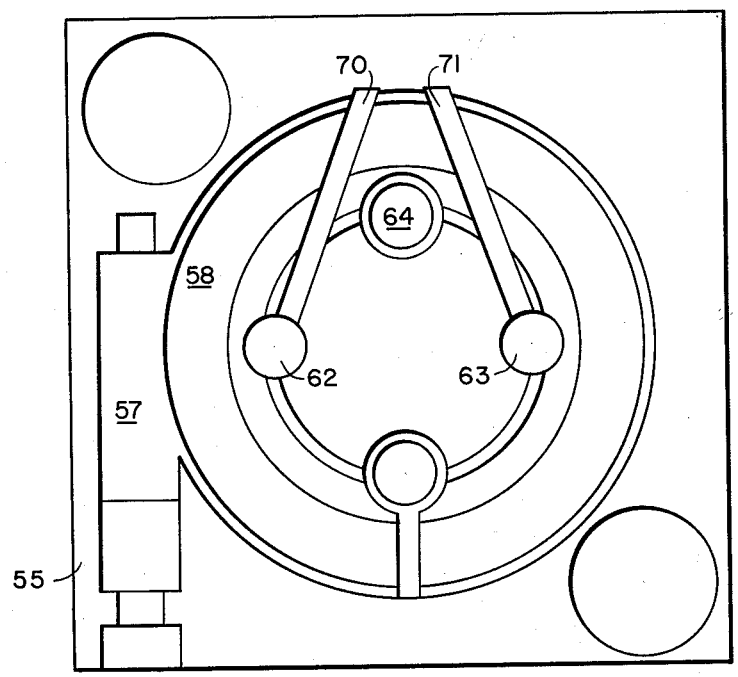
FIG. 7 is a plan view of a combined housing and coil retainer.
Figure 6:
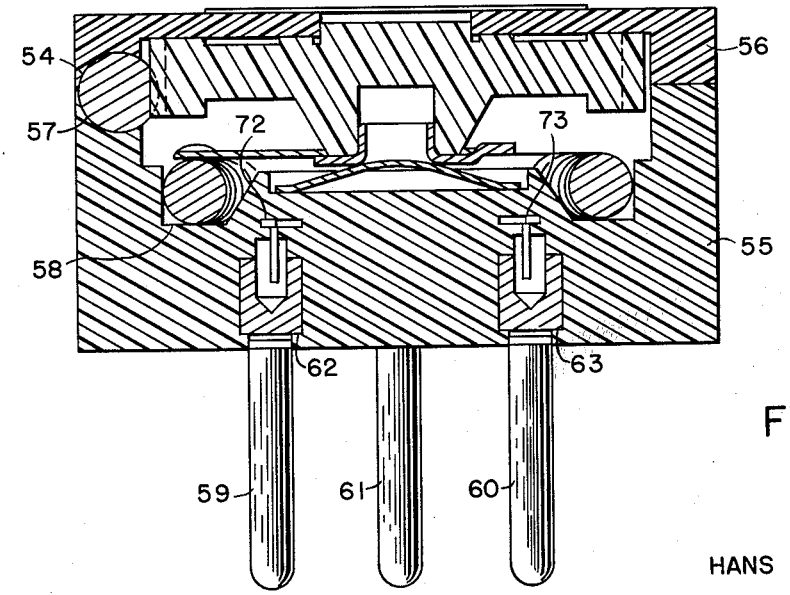
FIG. 6 is a cross-sectional view of another embodiment of the invention.
Figure 8:
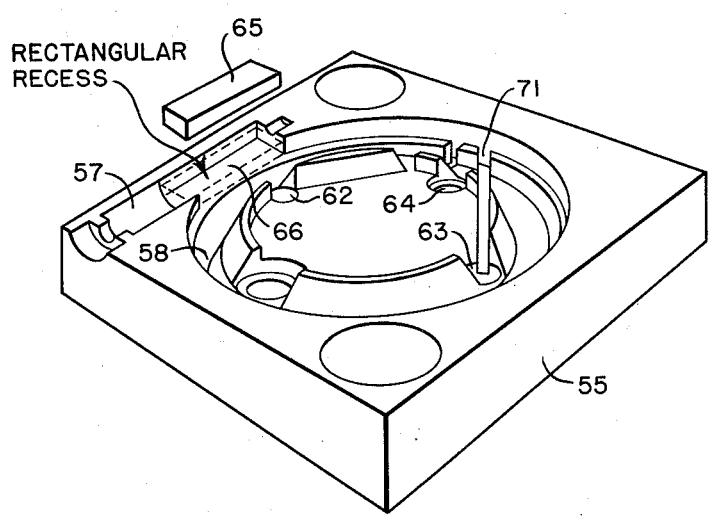
FIG. 8 is a perspective view of a combined housing and coil retainer.

An alternative embodiment of this invention is illustrated in FIGS. 6, 7 and 8. In this version of the potentiometer, the coil retainer and a portion of the housing comprise a single molded element. This alternative embodiment is also provided with terminals adapted for use with printed circuitry. However, it will be obvious to those skilled in the art that external circuit connections can be made by lead wires in the manner heretofore shown, or that the printed circuit terminals shown hereinafter may be used in the potentiometer described above.

Referring now to FIG. 6, the potentiometer housing includes base element 55 and cover element 56 each preferably molded of a plastic such as glass filled diallyl phthalate resin. Base element 55 is shown in plan view in FIG. 7 and perspective view in FIG. 8. Referring to these three figures, base element 55 is molded so as to provide a half cylindrical cavity 57 which mates with a like half cylindrical cavity 54 molded in the cover member 56 for retaining the worm gear. This construction obviates machining or drilling on either the base element or cover element thereby reducing the cost. In this embodiment, as in the one described hereinbefore, it is desirable to friction load the worm gear. This may be very conveniently accomplished by inserting a resilient rectangular element 65 (see FIG. 8) constructed preferably from polychlorotrifluoroethylene into a rectangular groove 66 molded into the base element 55. When so inserted, the resilient block 65 extends somewhat into the space in which the worm gear will be located, as denoted by the dotted lines in FIG. 8. With the worm gear and resilient block inserted and the cover element and the base element joined, the resiliency of the block 65 will cause it to deform to provide the desired function loading. The worm gear will then be substantially unaffected by very high shock and vibration.

A groove 58 following a circular path is molded in the base element 55 for providing the resistance coil retainer. Terminal pins 59, 60 and 61 are retained in respective orifices 62, 63 and 64 in the base member 55. Rectangular grooves 70 and 71 are molded in the element 55 for retaining respective thin metal strips 72 and 73 for connecting the terminal pins to appropriate taps on the resistance elements. The grooves 70 and 71 are formed at the appropriate angle from a contact pin to the coil retaining groove 58 so that the resistance coil is tapped at the required points. This construction affords an accurate positioning of the resistance taps since the metal strips are merely laid in the rectangular grooves after which the resistance element is fitted in the coil retaining groove 58 and cemented to the metal strips at the tap positions. The tap placement is molded automatically at the time the base element is formed and no additional drilling or measuring is required. Terminal pins 59 and 60 are respectively connected to the two flat metal strips 72 and 73, such connections being shown in FIG. 6. Terminal pin 61 is connected to the spring element which may be identical to spring 30 previously shown and described. A small wire formed of, for example, nickel may be used to connect the terminal pin 61 to the spring.

The cover element 56 is a molded element of simple construction. The contact pins, resistance element, spring, contact arm, worm gear and spur gear are each placed in the position shown in FIG. 6 after which the cover element 56 is placed in the position shown and affixed to the base element by any suitable means. These elements, shown in FIG. 6 but not described in detail, may be identical in construction and function as the elements previously shown and described in FIGS. 1 and 2.

A still further embodiment of this invention is shown in FIGS. 9 and 10. FIG. 9 shows just the upper portion of a cutway view of a potentiometer; the remainder of the potentiometer may be identical to that of the embodiments hereinbefore shown and described. As shown in this figure, the disc-shaped element 73 has only a slightly smaller diameter than that of the cylindrical cavity in the upper or cover element 74 so that the element will rotate about a substantially fixed axis relative to the housing. The element 73 is preferably formed of a low friction material so that it will smoothly ride within the housing 74. As shown in this structural form, the housing does not require any opening for mounting the element 73.

An additional feature of this embodiment is that driven element 73 may be a simple disc without any teeth formed thereon if it is constructed from a suitable resilient material. The preferred material for this application is polytetrafluoroethylene resin. This material has a much lower coefficient of friction than other resilient materials such as polychlorotrifluoroethylene, and is also more easily temporarily deformed. Thus, when the worm gear 14 and the element 73 are in the positions shown in FIG. 9, disc-shaped element 73 is temporarily deformed to allow the worm gear teeth to engage the disc. As the worm gear 14 is rotated, element 73 will likewise rotate in the same manner as if teeth had been preformed on the element since new "teeth" will be temporarily formed on element 73 adjacent the worm gear.

The potentiometers shown and described heretofore are so constructed that the worm gear may be continuously rotated in a given direction. Since the resistance element is laid in a circular path, this type of construction causes the resistance connected to the output terminals to abruptly change from a minimum to a maximum value, as the contact arm passes over the gap between the ends of resistance elements. In some circumtances, such an abrupt resistance change may not be desirable or tolerable. Therefore, a potentiometer having the features enumerated above with the additional feature of a unique stop for the movable contact arm is described hereinafter.

An exploded view of the stop mechanism is shown in FIG. 11. Worm gear 14 may be identical to the worm gears used in the prior potentiometer embodiments and, as before, this worm gear mates with a spur gear. The spur gear 75 illustrated in FIG. 7 is similar to spur gear 15 previously shown with the exception that a plurality of teeth are removed, leaving a blank base 76 and a rectangular support 90. Spur gear 75 further includes the annular groove 24 formed in the top side of the gear into which is inserted a stop disc 78. The stop disc is substantially washer-shaped with a projecting member 79 bent at right agnles to the disc and having tabs 80 and 81 bent at an angle to member 79. Projection 79 is placed upon the support 90 with the tabs 80 and 81 respectively adjacent the end teeth 82 and 83 of the spur gear 75. These tabs, when not deformed, lie in approximately the same position as normal teeth adjacent the respective end teeth 82 and 83, as shown by the dotted teeth in FIG. 12. An additional protruding tab 84 is bent at right angles to the surface of the disc.

The stop disc 78 may be formed from a flat piece of thin sheet material; preferably, the material selected is spring-like in nature so that the tabs 80 and 81 may be bent slightly without permanently changing their angular relationship to the projection 79. In order to permit the tabs to be bent while minmizing the breakage thereof, the member 79 is undercut at 91 and 92 thus lengthening the effective bending arm for each of the tabs 80 and 81. An adidtional element of the stop mechanism shown in FIG. 12 is a stop boss 87 affixed to the potentiometer case.

Figure 12:
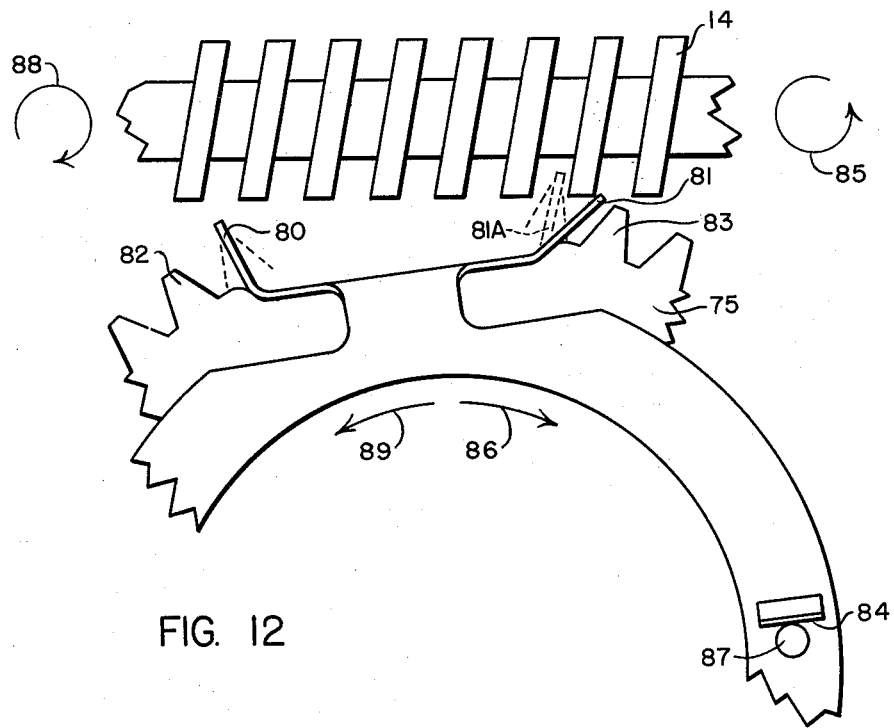
FIG. 12 is a plan view of the stop mechanism.

The operation and assembly of the stop mechanism is illustrated in FIG. 12. The stop boss 87 is rigidly attached to the potentiometer case and preferably is integrally formed on the bottom surface of the potentiometer cover. When the worm gear 14 is rotated in a counterclockwise direction as denoted by the arrow 85, the spur gear will rotate in a clockwise direction as denoted by the arrow 86. When the tab 84 contacts the stop 87, tooth 83 of the spur gear will have just moved beyond the worm gear teeth. There is, therefore, no force applied on the spur gear teeth in the stop position thus preventing stripping of or damage to the teeth.

In the position shown in FIG. 12, tab 81 serves as an escapement mechanism; each rotation of the worm gear in the direction of arrow 85 causes the tab to bend from its normal position (shown in dotted lines 81a) and then spring back to its former position. When, however, the worm gear is rotated in a clockwise direction, denoted as arrow 88, a force will be applied to the tab 81a in an opposite direction. Since the spur gear 75 is not retained by tab 84 abutting stop boss 87 in this direction, spur gear 89 will be caused to rotate in a counterclockwise direction as denoted by arrow 89. Immediately following tab 81 is a spur gear tooth 83 which engages the worm gear 14. The worm gear and spur gear now operate in the normal manner until the stop disc tab 84 abuts stop boss 87 in the opposite direction. Tab 80 of the stop disc then provides the escapement mechanism in the same manner as was heretofore described in reference to tab 81. It will be understood that the stop mechanism may be provided for any position of the contact arm by suitably positioning stop boss 87 relative to tab 84. Ordinarily, of course, tab 84 and stop boss 87 will be positioned relative to each other so that the movable contact will not cross the gap separating the ends of the resistance element.

Although exemplary embodiments of the invention have been disclosed and discussed, it will be understood that other applications of the invention are possible and that the embodiments disclosed may be subjected to various changes, modifications and substitutions without necessarily departing from the spirit of the invention.

I claim as my invention:

1. A variable resistance comprising a housing, a resistance element mounted within said housing, a contact member engaging said resistance element, means for rotatably mounting said contact member including a contact mounting gear rotatably mounted with respect to said housing and in fixed relationship with said contact member, a worm gear mounted in said housing in engagement with said gear, said worm gear having an annular groove extending into a cavity formed within said housing, and means formed of a resilient material such as polychlorotrifluoroethylene resin retained in said cavity and deformed by the face of said annular groove for friction loading the worm gear.

2. A variable resistance comprising a housing, a resistance element mounted within said housing, a contact member engaging said resistance element, a member formed of resilient material rotatably mounted within said housing, and a hexagonally shaped protrusion formed in said contact member which engages and deforms a circular opening in said rotatable member.

3. In a variable resistance, a housing, a resistance element, and means for mounting said resistance element within said housing comprising a block of resilient material having an annular groove formed in a face thereof, said groove being undercut with said face extending over a portion thereof so that said resistance element may be snapped into place and retained securely without the use of cement.

4. In a potentiometer having a movable contact affixed to a gear, and a worm gear in driving relationship with said gear, the improvement comprising a potentiometer housing having a pair of mated members each having formed therein a half cylinder, the half cylinders in each member being located opposite each other when the members are fixedly mounted together so as to form a complete cylinder for retaining said worm gear, and means for friction loading said worm gear comprising an element composed of a resilient material such as polychlorotrifluoroethylene resin integral with one of said half cylinders and in engagement with said worm gear.

5. A variable resistance comprising a housing having a base and a top member, a groove formed in the upper face of said base member which follows a substantially circular path, an electrical contact mounted in said base member within the area bounded by said circular groove, a groove in the upper face of said base member which follows a substantially linear path extending from said electrical contact to a predetermined point of said circular groove, a resistance element retained in said circular groove, electrically conductive means retained in said linear groove and in contact with said resistance element at said predetermined point, and contact means electrically contacting said resistance and rotatably mounted to said housing.

6. A variable resistance comprising a housing having top, bottom and side walls; a coil retainer comprising a substantially disc-shaped member of insulating material fixedly mounted to said bottom wall, said coil retainer having a groove in its upper face which follows a substantially circular path, a resistance element fixedly mounted in said groove; contact means electrically contacting said resistance and rotatably mounted to said housing about a first axis perpendicular to said top and bottom faces; said coil retainer having a slot therein exposing the ends of said resistance element, a circular orifice in one of said side walls facing said slot, a cylindrical plug mounted in said circular orifice having a first orifice and a first pocket spaced along a second axis substantially perpendicular to said bottom and top walls and a second orifice and a second pocket spaced along a third axis substantially perpendicular to said bottom and top walls, said second and third axes being located adjacent the points of desired contact with the ends of said resistance element, a first electrical lead passing through said first orifice, the end of said first lead being bared, bent in a U-shape and inserted in said first pocket; and a second electrical lead passing through said second orifice, the end of said second lead being bared, bent in a U-shape and inserted in said second pocket.

7. A variable resistance comprising a housing; a resistance element mounted within said housing; a contact member engaging said resistance element; means for rotatably mounting said contact member including a disc of resilient, easily temporarily deformable material characterized by a low coefficient of friction, said disc being mounted with a cylindrical cavity formed within said housing and in fixed relationship with said contact member, said cavity having a diameter only slightly larger than the diameter of said disc so that the disc may rotate about a substantially fixed axis relative to the housing, and a worm gear retained in said housing so that its teeth engage and temporarily deform a peripheral portion of said disc.

8. The variable resistance element defined in claim 7 wherein said disc is formed of polytetrafluoroethylene.

9. A variable resistance comprising a housing; a resistance element mounted within said housing, a contact mounting gear rotatably mounted within said housing, a worm gear mounted in said housing in engagement with said contact mounting gear, a contact member affixed to said contact mounting gear and engaging said resistance element, an electrically conductive spring comprising a substantially disc-shaped member having an arcuate cross section, the convex side of said spring abutting said contact member and the concave side of said spring abutting and fixedly retained by said housing, said spring making a slip-ring electrical contact with said contact member and preventing said contact member and rotatable member from vibrating.

10. A variable resistance comprising a housing; a resistance element mounted within said housing; a contact mounting gear comprising a continuous disc of resilient nonconductive material having a circular boss located coaxially with the axis thereof, said boss being rotatably mounted in a mating orifice extending entirely through a wall of said housing; a worm gear mounted in said housing in engagement with said contact mounting gear; a contact member affixed to said contact mounting gear and engaging said resistance element, and an electrically conductive spring fixedly retained by said housing and engaging said contact member for making a slip-ring electrical contact to said contact member and preventing said contact member and rotatable member from vibrating.

11. A variable resistance comprising a housing including substantially parallel top and bottom walls and a cylindrical cavity formed therewithin with the axis of said cavity being substantially perpendicular to said top and bottom walls; a resistance element mounted within said cavity nearest said bottom wall; a movable contact member; means for rotatably supporting said contact member and providing a continuous insulative cover of high resistance between said top wall and said resistance element and movable contact including a gear comprising a continuous disc of resilient nonconductive material, said movable contact being in fixed engagement with said gear on one face thereof, said gear being rotatably mounted within said cavity with said one face opposite said resistance element and the other face of said gear opposite said top wall, means including an electrically conductive spring mounted between the bottom wall of said housing and said gear for making an electrical connection between the outside of said housing and said contact member, and a worm gear mounted in said housing and engaging said gear.

12. The variable resistance defined in claim 11 wherein said gear includes a circular boss located coaxially with the axis thereof, said boss being rotatably mounted in a mating orifice extending entirely through said top wall.

References Cited in the file of this patent
UNITED STATES PATENTS

| | | |
|---|---|---|
| 2,477,711 | Youhouse | Aug. 2, 1949 |
| 2,596,503 | Newnham | May 13, 1952 |
| 2,880,293 | Blanco | Mar. 31, 1959 |
| 2,952,825 | Bourns | Sept. 13, 1960 |
| 2,968,015 | Blanco | Jan. 10, 1961 |